F. H. WOLEVER.
PNEUMATIC DESPATCH TUBE SYSTEM.
APPLICATION FILED OCT. 12, 1907.

898,542.

Patented Sept. 15, 1908.
5 SHEETS—SHEET 1.

F. H. WOLEVER.
PNEUMATIC DESPATCH TUBE SYSTEM.
APPLICATION FILED OCT. 12, 1907.

898,542.

Patented Sept. 15, 1908.
5 SHEETS—SHEET 4.

Witnesses:

Inventor
Franklin H. Wolever
by Poole & Brown, Attys.

UNITED STATES PATENT OFFICE.

FRANKLIN H. WOLEVER, OF CHICAGO, ILLINOIS, ASSIGNOR TO THE ILLINOIS PNEUMATIC TRANSMISSION CO., OF CHICAGO, ILLINOIS, A CORPORATION OF SOUTH DAKOTA.

PNEUMATIC-DESPATCH-TUBE SYSTEM.

No. 898,542.   Specification of Letters Patent.   Patented Sept. 15, 1908.

Application filed October 12, 1907. Serial No. 397,157.

*To all whom it may concern:*

Be it known that I, FRANKLIN H. WOLEVER, a citizen of the United States, and a resident of Chicago, in the county of Cook and State of Illinois, have invented certain new and useful Improvements in Pneumatic-Despatch-Tube Systems; and I do hereby declare that the following is a full, clear, and exact description thereof, reference being had to the accompanying drawings, and to the letters of reference marked thereon, which form a part of this specification.

This invention relates to improvements in pneumatic despatch tube systems and the invention consists in the matters hereinafter set forth and more particularly pointed out in the appended claims.

Certain of the features of my invention relate to improvements in that type of despatch tube systems shown in the prior United States patent to Stange, No. 743,109, dated November 3rd, 1903, wherein provisions are made for mechanically guiding cartridges from a central or cashier's station through a main trunk line into either of a number of branches leading from said trunk line.

Other features of the invention relate to the salesmen's trunk line and branches by which cartridges are despatched from a plurality of outlying stations to a central or cashier's station.

Among the objects of the invention is to simplify and improve the construction and arrangement of pneumatic despatch tube systems for conveying cartridges or carriers from one point to another, to insure certainty and promptness in the delivery of cartridges from a sending station to a given receiving station, and to prevent clashing of the cartridges in transit.

Figure 1:
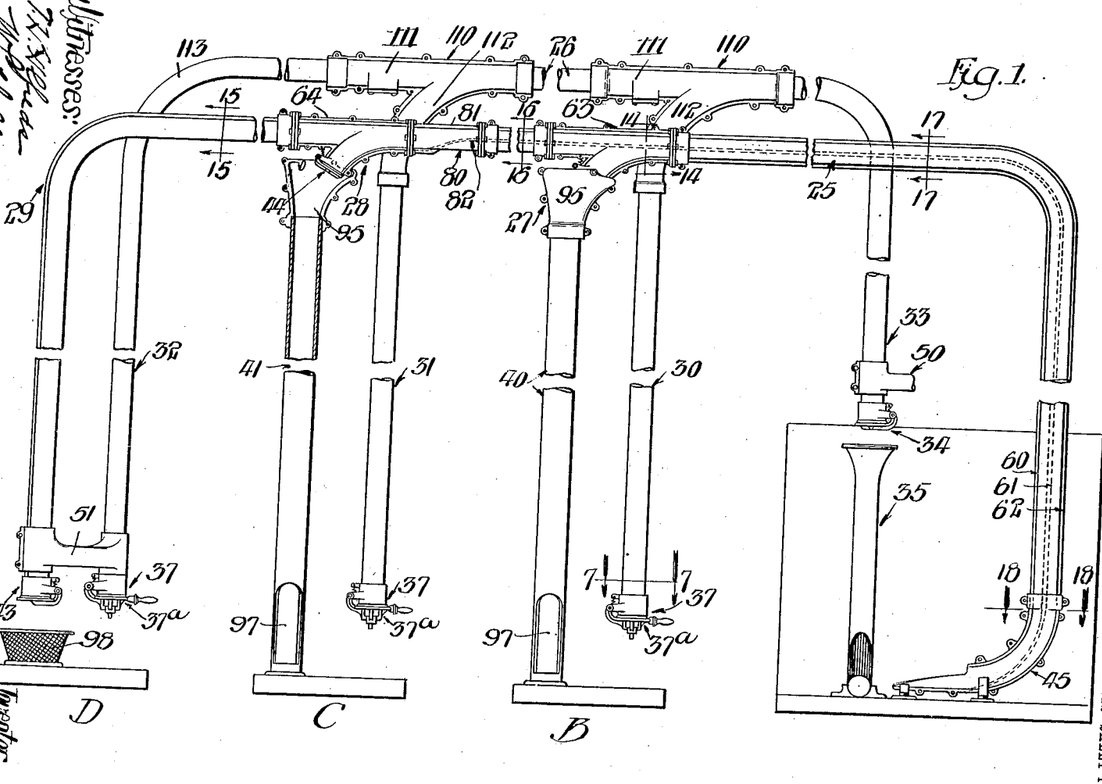
—Figure 1 is a diagrammatic view illustrating a typical arrangement of an outgoing and return despatch tube system showing the application of my invention thereto.
Figure 2:
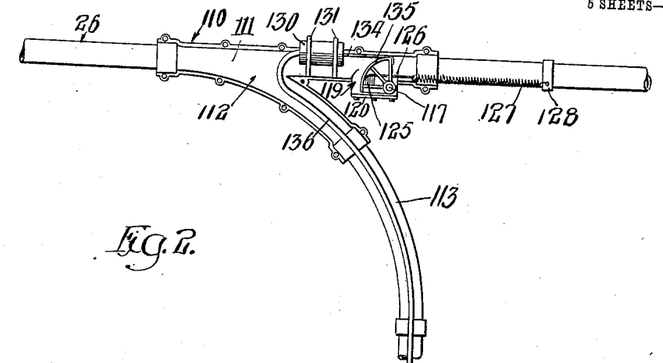
Fig. 2 is a fragmentary view illustrating a portion of the salesmen's trunk line and one of the salesmen's branches and its sending box.
Figures 11, 12, 13, 14, 15, 16, 17:
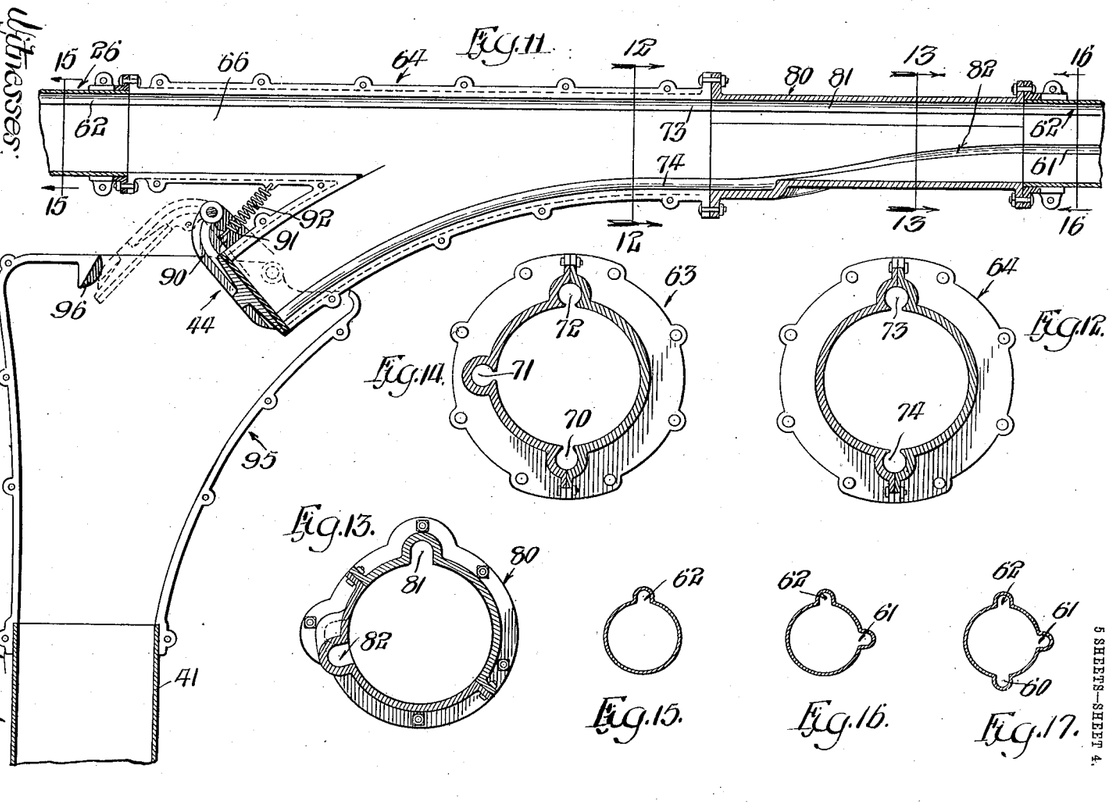
Fig. 11 is a central section of the cashier's trunk line, the salesmen's receiving branch leading therefrom and the valve mechanism between said branch and the cashier's trunk line.
Fig. 12 is a transverse section, taken on line 12—12 of Fig. 11.
Fig. 13 is a transverse section, taken on line 13—13 of Fig. 11.
Fig. 14 is a transverse section, taken on line 14—14 of Fig. 1.
Figs. 15, 16 and 17 are transverse sections, taken on lines 15—15, 16—16 and 17—17, respectively, of Fig. 1.
Figures 18, 19:
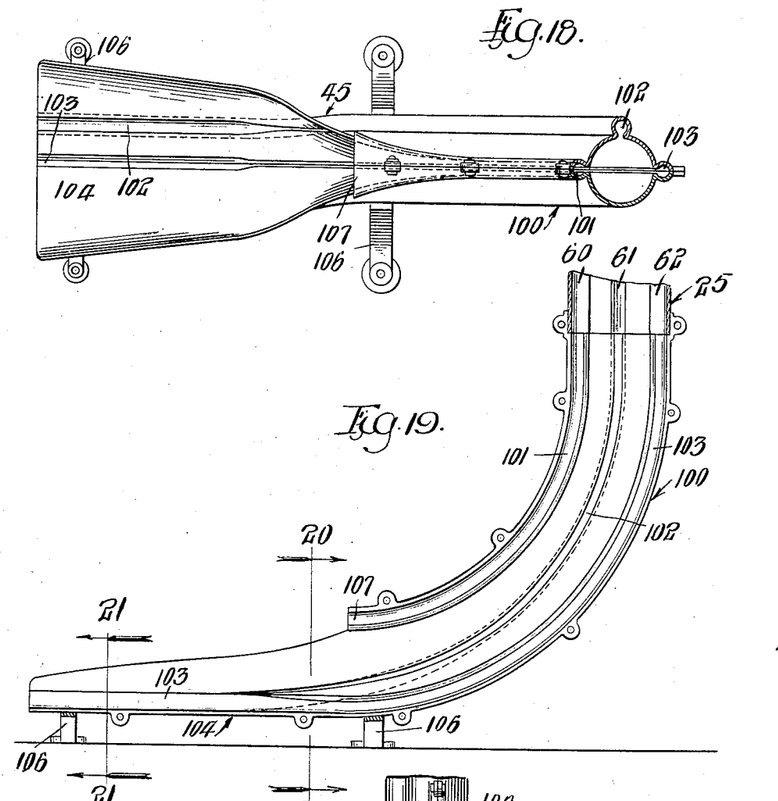
Fig. 18 is a horizontal section taken on line 18—18 of Fig. 1.
Fig. 19 is an axial section of the fitting shown in Fig. 18.
Figures 20, 21:
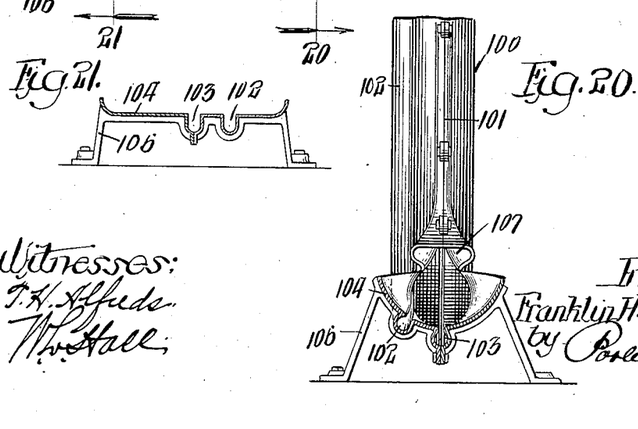
Figs. 20 and 21 are vertical sections taken on lines 20—20 and 21—21, respectively, of Fig. 19.

As shown in the drawings, reference being made more particularly to Fig. 1, 25 designates the cashier's sending tube or trunk line through which the cartridges are despatched from the cashier's desk to the several outlying or salesmen's stations B, C and D, and 26 designates the salesmen's sending tube or trunk line through which the cartridges are despatched from the several salesmen's stations to the cashier's station. The cashier's trunk line is provided with a plurality of branches 27, 28 and 29 leading to the salesmen's stations B, C and D, respectively, and the salesmen's trunk line is likewise provided with a plurality of branches 30, 31 and 32 leading from said salesmen's stations B, C and D, respectively, to the salesmen's trunk line. The said salesmen's trunk line terminates at the cashier's desk in a downwardly turned portion 33 provided at its lower end with a spring closed door 34 which normally seals the system at this point. The cartridges are discharged from the salesmen's trunk line into a receiving terminal 35 which may be of any desired or preferred form, and which is herein shown as of the consecutive terminal type. The salesmen's sending branches 30, 31 and 32 are provided with sending boxes 37, 37, shown in Figs. 7 and 8, and hereinafter to be described. The salesmen's receiving branches 27 and 28 discharge into receiving terminals 40 and 41 which extend to the salesmen's stations B and C. The terminal receiving branch 29 constitutes a continuation of the cashier's trunk line and is provided at its lower end at the station D with a spring closed door 43 similar to the door 34 in the discharge end of the salesmen's trunk line. The branches 27, 28 of the cashier's trunk line are normally closed by spring closed valves 44, as best shown in Figs. 1 and 11, said valves opening under the impact of a cartridge when directed to said branches to permit the cartridge to pass therethrough to the receiving fittings 40 and 41. The cashier's trunk line is provided with a sending terminal or fitting 45 which is shown in detail in Figs. 18 to 21 and is hereinafter described.

50 designates a suction pipe which connects the discharge end of the salesmen's trunk line with a suitably located vacuum pump, not herein shown.

51 designates a by-pass which connects the terminal branch 29 of the cashier's trunk line with the terminal receiving branch 32 of the salesman's station D, said by-pass being located adjacent to the sending box 37 and the spring closed valve 43 of the branch 29. The cashier's sending terminal 45 remains always open, this being the single point in the system, as herein arranged through which air is normally admitted to the system under the influence of the vacuum pump connected with the system by the pipe. With this arrangement, the connection of the single vacuum pipe 50 with the system at the terminal of the salesmen's trunk line establishes and maintains a vacuum in all parts of the system and in the proper directions to carry the cartridges to their intended destinations.

My improvements relate in part to the construction and arrangement of the cashier's sending or trunk line and the discharge branches leading therefrom to the several salesmen's stations, whereby a cartridge may be unerringly directed from the cashier's station to a given salesman's station. This feature of my invention is shown and broadly claimed in the aforesaid patent to Stange and consists, in general terms, in providing the cashier's trunk line with a plurality of longitudinal guides, (as in the form of grooves) on the inner surface of the tube or passageway constituting said trunk line which extends throughout the length of said tube and into the branches leading to the salesmen's stations, the said guides being adapted for engagement by complemental guides on the cartridges and there being a number of guides in the trunk line equal to the number of salesmen's stations. A cartridge to be delivered at a given salesman's station is adjusted to its proper guide at the cashier's station and is directed by engagement therewith until it is fully delivered to the branch leading to said salesman's station.

The receiving end of the cashier's trunk line is provided with a number of longitudinal guide grooves equal to the number of salesmen's stations to be served from the cashier's desk. As herein shown there are three stations and the cashier's trunk line is provided with three angularly or circumferentially separated guide grooves 60, 61 and 62, the former located at the bottom of the horizontal portion of the cashier's trunk line, the second at the lateral side thereof and the latter at the top. In the arrangement herein shown, the bottom guide groove 60 is designed to serve the salesmen's station B, the top guide groove 62 is designed to serve the salesmen's receiving station D, while the side guide groove 61 is designed to serve the intermediate salesman's station C.

The cartridges belonging to the several stations are suitably marked or designated to correspond with selected designations given the several salesmen's stations. The several guide grooves of the sending terminal of the cashier's trunk line are appropriately designated to correspond with the designating marks of the cartridges. The cartridges fit closely in the principal parts of the cashier's trunk line, as is usual, and the guide grooves 60, 61 and 62 are preferably made of the cross-section shown in Figs. 15, 16 and 17 in such parts of the line; the sole function of the grooves in the parts of the tube line in which the cartridges closely fit being to maintain the guide projections of the cartridges engaged with their proper grooves. The parts of the cashier's trunk line containing the guide grooves of the cross-section, shown in Figs. 15, 16 and 17, are made of drawn sheet metal, the cross section of the grooves permitting the tube to be readily drawn. At the junction of all of the branches of the cashier's trunk line with the salesmen's receiving branches, with the exception of the last branch or terminal 29, the said cashier's trunk line is enlarged and it is necessary that the guide grooves at these parts of the line which extend beyond said branches be of undercut cross section and the guide projections of the cartridges correspondingly formed so that the cartridges will be suspended from the wall of the tube when passing through such parts. At the points where the several branches, except the terminal 29, leave the cashier's trunk line are located junction fittings 63, 64, shown in place in Fig. 1 and in detail in Figs. 11, 12 and 14. Said fittings each consists of a main body portion 66 disposed in alinement with the main body of the trunk line, and short branch portions which have heretofore been designated as 27 and 28. For convenience in manufacture, said fittings are made in two lateral parts or halves secured together by bolts and are formed at their ends for suitable connection with the next adjacent parts or sections of the cashier's trunk line.

The junction fitting 63 is provided with three guide grooves 70, 71 and 72 which register with the guide grooves 60, 61 and 62, respectively, of the main or sheet metal portion of the cashier's trunk line. The junction fitting 64, corresponding with the salesman's station C, is provided with but two grooves 73, 74, located, respectively, at the top and bottom of the fitting, said grooves constituting continuations of the top and side grooves 62, 61 respectively, of the main portion of the trunk line tube, the groove 60 having terminated in the branch portion 27 of the junction fitting 63. The said grooves of the junction fittings 63 and 64 are undercut, as will be noted by inspection of Figs. 12 and 14. The lower groove 70 of the junction fitting 63 enters the branch 27 of said fitting sufficiently to deliver the cartridge fully into said branch, and the undercut cross-section of the groove guides said cartridge into the branch notwithstanding the tendency of said cartridge to continue in a straight course. The other two undercut grooves 71 and 72 of the fitting 63 extend through said fitting at the side and top thereof and communicate with the grooves 61 and 62 of the main or sheet metal body of the trunk line tube. The undercut cross-section of the grooves 71 and 72 acts to support cartridges as they pass through the enlarged part of the fitting 63. The top undercut guide groove 73 of the fitting 64, belonging to the salesman's station C, communicates and is in register with the top guide groove 62 of the sheet metal portion of the trunk line, the undercut cross-section of said groove serving to support the cartridge while passing through the fitting 64. Said top guide groove 62 continues to the end of the terminal branch 29 of the trunk line, the downward curve by which the branch 29 communicates with the cashier's trunk line being of such radius to permit the cartridge to pass therethrough without enlarging the tube.

There is interposed between the junction fitting 63 and the fitting 64 a tubular fitting 80 which is provided in its top with a groove 81 constituting a part of the top guide groove of the cashier's trunk line and a downwardly curved or spiral side groove 82 which constitutes a part of the guide groove of the cashier's trunk line and serves to connect the side groove 61 of the sheet metal portion of the trunk line with the bottom groove 74 of the junction fitting 64. It has been found desirable to discharge all of the cartridges from the cashier's trunk line to the branch lines with the guide projections of the cartridges at the bottom of said trunk line, (with the exception of the terminal or extreme branch 29) in order to overcome the binding action between the guide projections of the cartridges and the walls of the guide grooves due to the tendency of the cartridges to follow a straight path. The spiral or downwardly turned groove 82 of the fitting 80 has the effect to gradually bring the guide projections of a cartridge to the bottom of the junction fitting where the cartridge is discharged into a branch without bringing undue twisting or torsional stress on the cartridge guide projections. In the present instance, where there are but three branches, but one of such spiral fittings is required, to-wit, that next in advance of the first branch leading to the salesman's station B. If, however, there be a number of salesmen's receiving branches, intermediate the first branch and terminal branch, each of the junction fittings of said intermediate branches will be likewise provided with a spiral fitting for the purpose just described.

The valve or door 44 for closing the branches 27 and 28 at the junction fittings is shown most clearly in Fig. 11. It consists of a flat plate that fits against and closes the end of the short branch of the fitting. It is provided with a pivot arm 90 extending laterally therefrom and hinged to a bracket 91 extending laterally from the branch of said fitting. The valve or door is held normally closed by a spiral contractile spring 92 fixed at one end to said pivot arm and at its other end to the main body of the junction fitting. The said branches 27 and 28 enter the enlarged upper ends or mouths 95 of the salesmen's receiving terminals 41, 42, said mouths being of sufficient dimensions to permit the doors or valves to fully open, as indicated in dotted lines in Fig. 11. Buffers 96 are provided against which the doors or valves strike at the limit of their opening movement. The doors or valves are opened by the impact of the cartridges thereagainst and are automatically closed by the springs 92 when a cartridge has been delivered through the branch.

The salesmen's receiving terminals 41 and 42 are provided at their lower ends, as herein shown, with openings 97 through which cartridges may be withdrawn therefrom when dropped to the bottom of said terminals. The receiving terminals 40 and 41 are made with smooth or ungrooved inner walls and of such diameters as to permit the cartridges and their guide extensions to drop freely therethrough by gravity. In the case of the terminal branch 29, the valve or door 43, which corresponds in function to the valves 44 of the other branches 27 and 28, is located at the extreme end of the branch and a basket 98 is placed beneath the branch to receive cartridges which are discharged therefrom.

Referring now to the construction of the sending terminal of the cashier's trunk line at the cashier's desk, the same is shown more clearly in Figs. 18 to 21, inclusive, and is made as follows: Said terminal comprises a main tubular portion 100 which fits the lower sheet metal portion of the cashier's trunk line tube and is provided with guide grooves 101, 102, 103 which register with the grooves 60, 61 and 62, respectively, of the cashier's trunk line. The said sending terminal curves laterally from its junction with the tube and terminates in a flat flaring portion 104 in the upper surface of which are formed continuations of the grooves 102 and 103 of the main body of the terminal. The receiving end of the groove 101 is located at the end and upper part of the tubular portion of the terminal and is provided with a flaring receiving mouth 107 to facilitate the entrance of the guide projections of the cartridge thereinto. The ends of said grooves 102 and 103 in the flaring portion of the terminal have wide receiving mouths or sides, being of the cross section shown in Fig. 21, so as to permit the guide projections of a cartridge to be placed directly thereinto while the cartridge occupies a horizontal position and without the necessity of inserting the said guide projections into the ends of said grooves. The receiving end of the groove 103 is located centrally of the flaring portion of the terminal in direct alinement with the part of the groove contained in the tubular portion of the terminal. The groove 102 is made of curved or spiral form in its part between the flaring and the tubular part of the terminal so as to gradually bring the guide projections of a cartridge into engagement with that part of the groove which lies at the side of the tubular portion of the terminal. The said groove 101 of said fitting may be of undercut cross-section. The parts of the grooves 102, 103 within the tubular part of the terminal may also be of undercut cross-section, said latter grooves widening at their upper or receiving sides towards the outer ends thereof.

In sending cartridges from the cashier's station to the several salesmen's stations, a cartridge is placed with its guide projections in the open outer end of one of the grooves 101, 102 or 103 according as it is to be sent to either station B, C or D. The cartridge is pushed towards the tubular or closed part of the terminal until it arrives in the influence of the vacuum in the system, by which it is carried to its proper destination. The guiding connections of the cartridge with the cashier's trunk line insures that the cartridge will be delivered to the proper receiving branch at the salesmen's station, and the undercut formation of the grooves of the junction pieces 63, 64 insures that a cartridge passing beyond a given branch will be properly supported while passing through the enlarged part of the tube. Each cartridge, excepting those delivered to the first and last stations, will be turned or rotated in the spiral fitting next adjacent to the branch through which it is to be discharged, so as to bring the guiding projections thereof to the bottom of the branch when it is discharged from the trunk line. The said sending terminal is fixed to the cashier's desk by means of short legs 106, 106, extending downwardly therefrom and designed to be attached to the desk by screws or the like.

The salesmen's sending branches 30 and 31 are connected with the salesmen's trunk line by junction fittings 110, 110 comprising main bodies 111 located in alinement with the trunk line, and branch portions 112 curving downwardly therefrom for connection with the vertical sending branches. The salesmen's sending branch 32 of station D constitutes a continuation of the salesmen's trunk line tube, being joined thereto by a curved portion 113.

Figure 10:
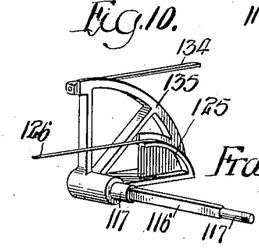
Fig. 10 is a perspective view of a portion of the valve actuating mechanism located at the junction of the salesmen's sending and the salesmen's trunk line for preventing the clashing of cartridges at this point.

Inasmuch as there is liability of two or more cartridges being inserted into the salesmen's branches at such consecutive periods, relatively to each other, as to cause a cartridge entering the trunk line from one of the branches to clash with a cartridge passing through the junction fitting at said branch, it is desirable to provide means for controlling or retarding the movement of a cartridge or cartridges in rear of the branch from which the cartridge is to be delivered to the salesmen's trunk line at the time said last cartridge is inserted into the system, and thus avoid liability of such clashing. As a further separate improvement I have provided means for effectively producing this result which will now be described, the same being shown in Figs. 2 to 6, inclusive, and Fig. 10.

Figures 3, 4:
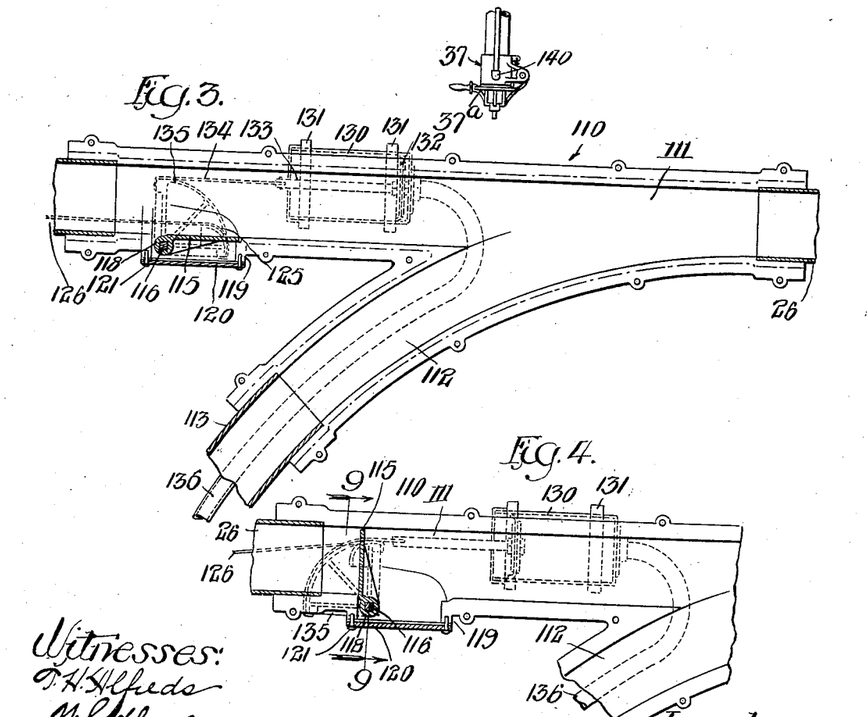
Fig. 3 is an enlarged section illustrating the junction fitting at the junction of a salesman's sending branch with the salesmen's trunk line.
Fig. 4 is a fragmentary view thereof with parts shown in changed position.
Figure 5:
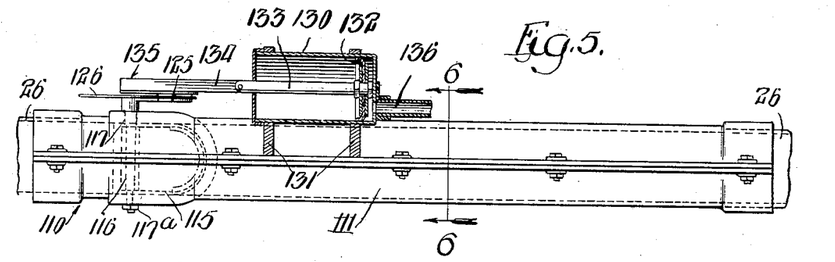
Fig. 5 is a top plan view of the said junction fitting.
Figure 6:
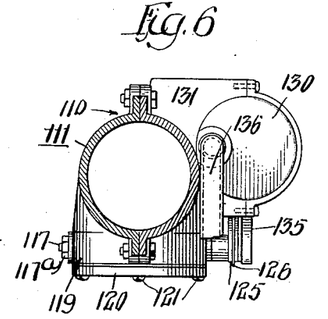
Fig. 6 is a transverse section, taken on line 6—6 of Fig. 5.
Figure 9:
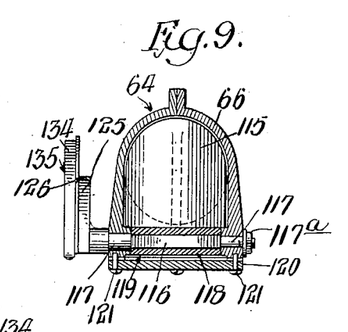
Fig. 9 is a transverse section taken on line 9—9 of Fig. 4.

Located within each junction fitting 110 in rear of the branch 112 thereof, with respect to the direction of the passage of the cartridges through said fitting, is a valve 115 mounted on a rock-shaft 116 that extends transversely across said fitting. The fitting is made of D-shape cross-section in the part thereof which contains the valve and it is provided at its sides with bearing apertures that receive cylindric bearing portions 117, 117 of the rock-shaft. The intermediate portion of said shaft is of angular cross-section to fit within a like shaped opening in an elongated sleeve or hub 118 of said valve and it is secured in place by means of a nut $117^a$ engaging the screw-threaded end thereof outside of the said fitting. The valve is made of a shape and size to fill the enlarged D-shape portion of the fitting when the valve is in its upper or closed position, as shown in Figs. 4 and 9, and said fitting is provided with a depressed portion 119 to receive the valve when in its closed position, as shown in Fig. 3, so that the valve will not obstruct the passage in the fitting for the cartridges. The said depressed portion of the tube has a bottom opening which is closed by a plate 120 that is secured thereto by screws 121 or the like. Thus when the plate 120 is removed and the rock-shaft withdrawn from the hub or sleeve of the valve, the said valve is free to drop out of the fitting. The valve is actuated to close the same by connections which are operated by the opening of the sending gate 37ª associated with the branch adjacent to the valve, so that when the gate of the sending box is opened to admit a cartridge into the branch associated with such valve, the valve is raised to its closed position so as to cut off the vacuum pump from that part of the system in rear of the valve, thus increasing the pressure therein to such extent as to slow down or retard cartridges in the part of the system thus temporarily cut out of the influence of the vacuum pump. At the time the valve is thus closed, the system receives air through the branch into which the cartridge has just been inserted, thus insuring the delivery of the cartridge from the branch to the salesmen's trunk line. Thereafter the connection between said valve and the gate 37ª of the sending box operates to lower the valve to its closed position and reëstablish the vacuum throughout the system. Means are provided, as will hereinafter be described, to maintain the vacuum in the sending branch into which the cartridge has been introduced and to maintain the reduced pressure in the system in rear of said sending branch until the cartridge has been fully delivered into the salesmen's trunk line, as will hereinafter be described.

One approved mechanism for operating the retarding valve 115 of the salesmen's trunk line to close the same at the time the sending door of a salesman's sending branch is opened, is herein shown and is made as follows: 125 designates a short sector fixed to or made integral with the rock-shaft of the valve 115. To the sector 125 is fixed one end of a strip or band 126, the other end of said band being attached to a spiral contractile spring 127 (Fig. 2) that is attached at 128 to a fixed part on the salesmen's sending trunk. Said swing serves to swing the valve into its closed position, as indicated in Fig. 4. 130 designates a cylinder which is fixed to the adjacent salesmen's sending trunk by a bracket 131 or other equivalent means. 132 designates a piston within said cylinder provided with a piston rod 133 which extends through one end or head of the cylinder. To the outer end of said piston rod is attached one end of a tape or band 134 which is fixed at its other end to one end of a larger sector 135 attached to or made integral with the rock-shaft 116. 136 designates a pipe which communicates at one end with the end of the cylinder opposite to the head through which the piston rod extends, and said pipe communicates at its other or lower end with the lower end of the interior of the salesmen's sending branch. As herein shown, said vacuum pipe 136 communicates with the salesmen's sending branch through the sending box 37 thereof, said box being provided with a nipple 140 into which the lower end of the vacuum pipe fits. When the spring closed gate 37ª of the salesmen's sending branch is in its closed position the vacuum established in said branch operates through said pipe to hold the piston in the position shown in Fig. 3, in which position said piston, acting through the piston rod 133, the band or tape 134 and the sector 135, serves to hold the valve in its normal or open position against the action of the spring 127. When the gate of the sending box is open therefore, to admit a cartridge to one of the sending branches, the vacuum in said pipe 135 is broken and the spring 127 operates to close the valve, with the result of increasing the pressure in the system in rear of said valve, as before stated. The spring 127 holds the valve closed until the salesmen's sending branch into which the cartridge has just been inserted is again closed, whereupon the vacuum is reëstablished in said vacuum pipe 136 and cylinder 130 and operates, through the piston and sector 135, to swing the valve into its lower or open position against the action of the spring 127. Thereafter the vacuum is reëstablished in that part of the system in rear of the valve 115 which has just been closed and opened, whereupon any cartridges contained in such part of the system resume their normal speed through the system.

Figure 7:
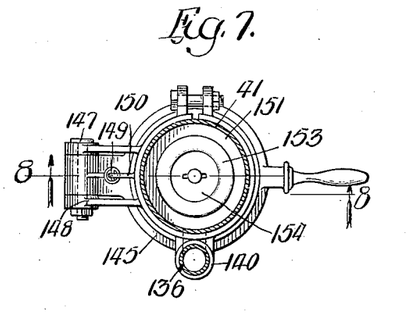
Fig. 7 is a transverse section taken on line 7—7 of Fig. 1.
Figure 8:
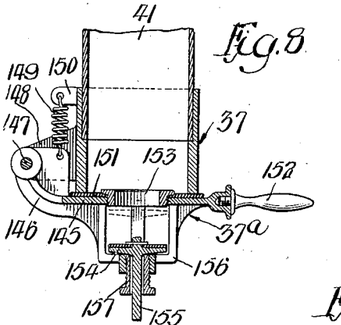
Fig. 8 is an axial section taken on line 8—8 of Fig. 7.

The construction of the spring closed gates 37ª of the sending boxes of the salesmen's sending branches is shown more clearly in Figs. 7 and 8 and is made as follows: Each of the gates comprises a flat plate 145 having an arm 146 that extends beyond the sending box and is pivoted by means of a pivot pin 147 to a bracket 148 fixed to or made integral with one side of the sending box. 149 designates a spiral contractile spring that is attached at one end to said arm of the sending gate and at its other end to a lug 150 fixed to or made integral with the sending box. The spring serves to normally hold the door in its closed position. The gate is provided on its upper or inner face with a yielding packing disk 151 by which an air tight joint is afforded between the gate and the end of the sending box. Said door or gate is provided with a handle 152 by which it may be opened. The spring 149 acts to quickly close the door when released from manual engagement. In order that air may be admitted to the branch associated with the door for a sufficient time to insure that a cartridge shall be delivered therefrom to the salesmen's trunk line, the gate is provided with an opening 153 which is adapted to be closed by a check valve 154 formed on the upper end of a stem 155 which has vertical guiding engagement with a frame 156 depending from said gate. The said shank 155 of said check valve has direct guiding engagement with a sleeve 157 fixed adjustably to said frame 155, the sleeve for this purpose being exteriorly screw-threaded for engagement with interior screw-threads of said frame. The low pressure established in the salesmen's branch, after the sending gate has been closed by its spring, and when the check valve is open, has the effect to raise the check valve up against the lower side of the gate and thus close the opening 153. Thereafter a vacuum is established in the valve actuating vacuum pipe associated with said branch, whereby the retarding valve is opened and vacuum reëstablished in that part of the system theretofore cut off from the vacuum pump by said retarding valve. The distance by which the said check valve is separated from the opening 153 of a given gate depends upon the distance of the salesmen's sending branch, with which the gate is associated, from the connection of the vacuum pump with the system. This relation is established in order that the effect of the vacuum to close said check valve shall be substantially uniform with respect to the time of their closing, and also in order that the valves may be closed without objectionable noise or jars. Thus the check valves associated with the sending boxes adjacent to the connection of the vacuum pump with the system are located farthest from the openings in the sending gates while those located farther remote from the connection of the pump with the system are located close to the openings of said gates.

While I have described the several features of construction embodied in the system herein illustrated with considerable particularity, it is to be understood that the invention in its several phases is not limited to such construction except as hereinafter specifically claimed. The system, as a whole, constitutes a complete working system, so far as is necessary to disclose with respect to the subject matter of invention herein claimed, but it will be understood that various features of the invention are susceptible to use in other relations so long as the essential laws of their structure and operation are observed.

I claim as my invention:—

1. In a pneumatic despatch tube system, the combination with a despatch tube and its branches, said tube being provided with a plurality of angularly separated, longitudinal, interior guides, each of which extends into one of the branches, of a sending terminal formed with a widened portion in which the receiving ends of the guides are located side by side.

2. In a pneumatic despatch tube system, the combination with a despatch tube and its branches, said despatch tube being provided with a plurality of longitudinally disposed, angularly separated, interior guide grooves, each of which enters one of said branches, of a sending terminal provided with a widened portion into which certain of said guide grooves are arranged side by side.

3. In a pneumatic despatch tube system, the combination with a despatch tube and its branches, said despatch tube being provided with a plurality of longitudinally disposed, angularly separated, interior guide grooves, each of which enters one of said branches, of a sending terminal provided with a widened portion, the guide grooves having extensions located in said widened portion, said extensions having wide receiving mouths, for the purpose set forth.

4. In a pneumatic despatch tube system, the combination with a despatch tube and its branches, said despatch tube being provided with a plurality of longitudinally disposed, angularly separated, interior guide grooves, each of which enters one of said branches, of a sending terminal provided with a flat portion in which are located, side by side, receiving extensions of certain of the guide grooves of said tube, the guide groove at the side of the tube being connected with the receiving extension thereof by a downwardly curved or spiral portion.

5. In a pneumatic despatch tube system, the combination with a despatch tube and its branches, said despatch tube having a plurality of angularly separated, longitudinally disposed, interior guide grooves, each of which enters one of the branches, and a cashier's sending terminal comprising a laterally curved tubular part having internal grooves corresponding to the grooves of the despatch tube, and provided with a flat flaring portion in which continuations of certain of the grooves are located side by side.

6. A sending terminal for pneumatic despatch tube systems comprising a tubular part and a flattened end portion, said tubular part being provided with a plurality of internal, angularly separated guide grooves, certain of which terminate side by side in the flattened part of the fitting.

7. In a pneumatic despatch tube system, the combination with a despatch tube, of a plurality of branches leading therefrom, the tube being provided with a plurality of longitudinally disposed, angularly separated, internal guide grooves, each entering one of said branches, certain of the guide grooves being of undercut cross-section at the junction of the branches with the tube, for the purpose set forth.

8. In a pneumatic despatch tube system, the combination with a despatch tube and its branches, said tube being provided with a plurality of longitudinally disposed, angularly separated, internal guide grooves, each of which enters one of the branches, of junction fittings joining the branches with the tube, each comprising a tubular body in axial alinement with the despatch tube and a short branch for connection with one of the tube branches, the body of the junction fitting containing parts of said guide grooves, which parts of the grooves in the fitting are of undercut cross-section, for the purpose set forth.

9. In a pneumatic despatch tube system, the combination with a despatch tube and its branches, said tube being provided with a plurality of longitudinally disposed, angularly separated, internal guide grooves, each of which enters one of the branches, of junction fittings joining the branches with said despatch tube, each comprising a tubular body in axial alinement with the despatch tube and a part branching therefrom, the tubular body of the junction fitting containing a portion of one of the guide grooves at its top, and such portion of the guide groove being of undercut cross-section, a receiving fitting provided with an enlarged mouth into which the branch of the junction fitting extends, and a valve closing said branch.

10. In a pneumatic despatch tube system, a junction fitting provided with a plurality of internal guide grooves of undercut cross-section.

11. In a pneumatic despatch tube system, a junction for connecting the main despatch tube with a branch, said fitting comprising a tubular body and a short branch and provided with a plurality of angularly separated, internal guide grooves of undercut cross-section, one of which enters said branch.

12. In a pneumatic despatch tube system, the combination with a despatch tube, of a plurality of branches leading therefrom, said tube being provided with a plurality of longitudinally disposed, angularly separated, internal guide grooves, each of which enters one of the branches, said guide grooves, except that associated with the terminal branch of the system, entering said branches at the bottoms thereof.

13. In a pneumatic despatch tube system, the combination with a despatch tube, of a plurality of branches leading therefrom, said tube being provided with a plurality of longitudinally disposed, angularly separated, internal guide grooves, each of which enters one of the branches, the guide groove or grooves located at the side of the despatch tube being curved downwardly to the bottom of the tube at its entrance to said branch or branches.

14. In a pneumatic despatch tube system, the combination with a despatch tube and its branches, said tube being provided with a plurality of longitudinally disposed, angularly separated, internal guide grooves, each extending into one of said branches, of a tubular fitting located between one of the branches and the main body of the despatch tube, and having an internal, downwardly curved or spiral groove for directing a lateral or side groove of the despatch tube to the bottom thereof.

15. In a pneumatic despatch tube system, a tubular fitting provided with a plurality of internal, angularly separated guide grooves, one of which curves downwardly from the side to the bottom of said fitting.

16. In a pneumatic despatch tube system, the combination with a main sending tube and its receiving branch provided with a sending gate, and means for inducing and maintaining a vacuum in the system, of means operated by the opening of said gate for cutting off communication between the vacuum inducing means and the part of the system in rear of said branch relatively to the direction of travel of cartridges in said system.

17. In a pneumatic despatch tube system, the combination with a main sending tube, its receiving branch provided with a sending gate and means for inducing a vacuum in the system, of a valve located in rear of said receiving branch for closing the part of the system in rear of the valve to the action of the vacuum inducing means, and means operating upon the opening of the sending gate of the branch for closing said valve.

18. In a pneumatic despatch tube system, the combination with a main sending tube, its receiving branch provided with a sending gate and means for inducing a vacuum in the system, of a valve located in rear of said receiving branch for closing the part of the system in rear of the valve to the action of the vacuum inducing means, means operating upon the opening of the sending gate of the branch for closing said valve, and means operating upon the closing of the branch for opening the valve to reëstablish the vacuum in all parts of the system.

19. In a pneumatic despatch tube system, the combination with a despatch tube and its receiving branch provided with a sending gate and means for inducing a vacuum in said system, of a valve in said tube in rear of said branch, and pneumatic means operating to normally hold the valve in its open position, arranged to permit the valve to be closed upon the opening of the branch to admit a cartridge into the system.

20. In a pneumatic despatch tube system, the combination with a despatch tube and its branch and means for inducing a vacuum in the system, of a valve located in the tube in rear of the branch, means normally holding the valve open comprising a cylinder, a piston therein operatively connected with said valve, and a vacuum pipe establishing communication between the end of the cylinder remote from the valve and the said branch, and a spring acting in opposition to the action of the piston, the parts being so arranged that when the vacuum is broken in the vacuum pipe and cylinder by the insertion of a cartridge into said branch the spring operates to close the valve, and when the branch pipe is closed the vacuum established in the said vacuum pipe and cylinder operates through said piston and against the action of the spring to open the valve.

21. In a pneumatic despatch tube system, the combination with a despatch tube and its branch provided with a despatch gate and means for inducing a vacuum in said system, of a valve in said tube in rear of said branch, pneumatic means operating when the gate is closed to hold the valve in its open position and permitting the valve to be closed when the branch is open, and means for retarding the full closing of the gate.

22. In a pneumatic despatch tube system, the combination with a despatch tube and its branch provided with a despatch gate and means for inducing a vacuum in said system, of a valve in said tube in rear of said branch, pneumatic means operating when the gate is closed to hold the valve in its open position and permitting the gate to be closed when the branch is opened, said gate being provided with an opening and a check valve carried by the gate adapted to be forced by the pressure of air behind it against the gate to close said opening.

23. In a pneumatic despatch tube system, the combination with a despatch tube and its branch provided with a despatch gate and means for inducing a vacuum in said system, of a valve in said tube in rear of said branch, pneumatic means operating when the gate is closed to hold the valve in its open position and permitting the gate to be closed when the branch is opened, said gate being provided with an opening, a check valve movable towards and from said gate, and means for adjusting the check valve towards and from said gate opening.

24. In a pneumatic despatch tube system, the combination with a despatch tube and its branch provided with a despatch gate and means for inducing a vacuum in said system, of a valve in said tube in rear of said branch, pneumatic means operating when the gate is closed to hold the valve in its open position and permitting the gate to be closed when the branch is opened, said gate being provided with an opening, a check valve movable towards and from said gate to close said opening, a guide stem on said valve and a sleeve having screw-threaded engagement with said gate in which said stem has guiding engagement.

25. In a pneumatic despatch tube system, the combination with a sending branch and a gate for closing the same, said gate being provided with an opening, a check valve movable towards and from the gate to close said opening, a stem for said valve and a sleeve having screw-threaded connection with the gate in which said stem has sliding engagement.

In testimony, that I claim the foregoing as my invention I affix my signature in the presence of two witnesses, this 24th day of September A. D. 1904.

FRANKLIN H. WOLEVER.

Witnesses:
WILLIAM L. HALL,
T. H. L. ALFREDS.